United States Patent
Anderson et al.

(10) Patent No.: US 10,569,673 B2
(45) Date of Patent: Feb. 25, 2020

(54) SUPPORT BASE FOR A CHILD SAFETY SEAT

(71) Applicant: Wonderland Switzerland AG, Steinhausen (CH)

(72) Inventors: Robert Scott Anderson, Narvon, PA (US); Curtis M. Hartenstine, Birdsboro, PA (US); David H. Lehman, Lancaster, PA (US); Patrick J. G. Bowers, Hockessin, PA (US)

(73) Assignee: Wonderland Switzerland AG, Steinhausen (CH)

( * ) Notice: Subject to any disclaimer, the term of this patent is extended or adjusted under 35 U.S.C. 154(b) by 86 days.

(21) Appl. No.: 15/911,122

(22) Filed: Mar. 4, 2018

(65) Prior Publication Data

US 2018/0251051 A1 Sep. 6, 2018

Related U.S. Application Data

(60) Provisional application No. 62/466,500, filed on Mar. 3, 2017, provisional application No. 62/513,759, filed
(Continued)

(51) Int. Cl.
*B60N 2/28* (2006.01)

(52) U.S. Cl.
CPC ......... *B60N 2/2821* (2013.01); *B60N 2/2875* (2013.01); *B60N 2/2887* (2013.01)

(58) Field of Classification Search
CPC .... B60N 2/2887; B60N 2/289; B60N 2/2893; B60N 2/2821; B60N 2/2827; B60N 2/2824; B60N 2/28; B60N 2/2875
(Continued)

(56) References Cited

U.S. PATENT DOCUMENTS

| 7,467,825 B2 * | 12/2008 | Jane Santamaria .. B60N 2/2824 297/253 |
| 8,100,474 B2 * | 1/2012 | Christ .................. B60N 2/2866 297/253 |

(Continued)

FOREIGN PATENT DOCUMENTS

| CN | 104859495 A | 8/2015 |
| DE | 202015100327 U1 * | 4/2016 ........... B60N 2/2824 |

(Continued)

OTHER PUBLICATIONS

An Office Action issued by the Japan Patent Office dated Mar. 5, 2019 in connection with Japanese patent application No. 2018-038607.
(Continued)

*Primary Examiner* — Milton Nelson, Jr.
(74) *Attorney, Agent, or Firm* — NZ Carr Law Office

(57) ABSTRACT

A support base for a child safety seat includes a coupling structure coupled to a shell and a latch device operable to engage with an anchor structure of a vehicle. The coupling structure includes a carrier pivotally connected with the latch device. The latch device is rotatable relative to the carrier and the shell between a storage position and multiple deployed positions for use, and the carrier is slidable relative to the shell in a first direction for displacing a distal end of the latch device outward and away from an end edge of the shell and in a second direction for displacing the distal end of the latch device toward the end edge of the shell. The support base further includes an adjustment latch movable to engage with the carrier for preventing its sliding in the first direction, and to disengage from the carrier for its sliding.

21 Claims, 8 Drawing Sheets

Related U.S. Application Data on Jun. 1, 2017, provisional application No. 62/547,397, filed on Aug. 18, 2017.

(58) Field of Classification Search
USPC .......................................... 297/256.16, 253
See application file for complete search history.

(56) References Cited

U.S. PATENT DOCUMENTS

| | | | | |
|---|---|---|---|---|
| 9,016,781 B2* | 4/2015 | Cheng | ................ | B60N 2/2821 297/216.11 |
| 2008/0277984 A1* | 11/2008 | Carine | ................ | B60N 2/2806 297/253 |
| 2013/0328369 A1* | 12/2013 | Mo | ....................... | B60N 2/28 297/250.1 |
| 2014/0354021 A1* | 12/2014 | Sedlack | .............. | B60N 2/2821 297/216.11 |
| 2016/0200225 A1* | 7/2016 | Van Der Veer | ...... | B60N 2/2812 297/256.16 |

FOREIGN PATENT DOCUMENTS

| | | | | |
|---|---|---|---|---|
| EP | 2251225 | A1 | 11/2010 | |
| EP | 2612793 | A2 | 7/2013 | |
| FR | 3002886 | A1 * | 9/2014 | ........... B60N 2/2821 |
| GB | 2523461 | A | 8/2015 | |
| JP | 2008-296693 | A | 12/2008 | |

OTHER PUBLICATIONS

A Notification of Reason for Refusal issued by the Korean Intellectual Property Office dated Mar. 28, 2019 in connection with Korean patent application No. 10-2018-0025685.

Aug. 18, 2018 Search Report from co-pending EP Patent Application No. 18159956.4.

* cited by examiner

SUPPORT BASE FOR A CHILD SAFETY SEAT

CROSS-REFERENCE TO RELATED APPLICATION(S)

This application respectively claims priority to U.S. Provisional Patent Application No. 62/466,500 filed on Mar. 3, 2017; and to U.S. Provisional Patent Application No. 62/513,759 filed on Jun. 1, 2017; and to U.S. Provisional Patent Application No. 62/547,397 filed on Aug. 18, 2017, the disclosures of each of which are incorporated herein by reference.

BACKGROUND

1. Field of the Invention

The present invention relates to support bases for child safety seats.

2. Description of the Related Art

Child safety seats currently available on the market may include a child seat that can be attached to a support base for easy installation on a vehicle seat. Different approaches have been proposed for restrictedly positioning the support base on a vehicle seat. In some existing products, the support base may be restrictedly positioned on the vehicle seat with the vehicle seatbelt, or an adjustable strap provided in the support base that can attach to an anchor structure provided in the vehicle. In some other products, a rigid shell of the support base may be assembled with latch devices that can attach to the anchor structure of the vehicle for restrictedly positioning the support base on a vehicle seat. However, the position of the anchor structure may vary depending on the model of the vehicle, which may make it difficult to properly attach the latch devices to the anchor structure.

Therefore, there is a need for an improved design that can be manufactured in a cost-effective manner, and address at least the foregoing issues.

SUMMARY

The present application describes a support base for a child safety seat that has latch devices adjustable to facilitate attachment of the latch devices to an anchor structure of a vehicle. The support base includes a shell having an end edge, a latch device having a distal end and operable to releasably engage with an anchor structure provided in a vehicle at the distal end thereof, and a coupling structure coupled to the latch device and the shell. The coupling structure includes a carrier that is pivotally connected with the latch device and is slidable relative to the shell, the latch device being rotatable relative to the carrier and the shell between a storage position and multiple deployed positions for use, and the carrier being movable relative to the shell in a first direction for displacing the distal end of the latch device outward and away from the end edge of the shell and in an opposite second direction for displacing the distal end of the latch device toward the end edge of the shell. The support base further includes an adjustment latch movable to engage with the carrier for preventing sliding of the carrier relative to the shell in the first direction, and to disengage from the carrier for sliding of the carrier relative to the shell.

DETAILED DESCRIPTION OF THE EMBODIMENTS

Figure 1:
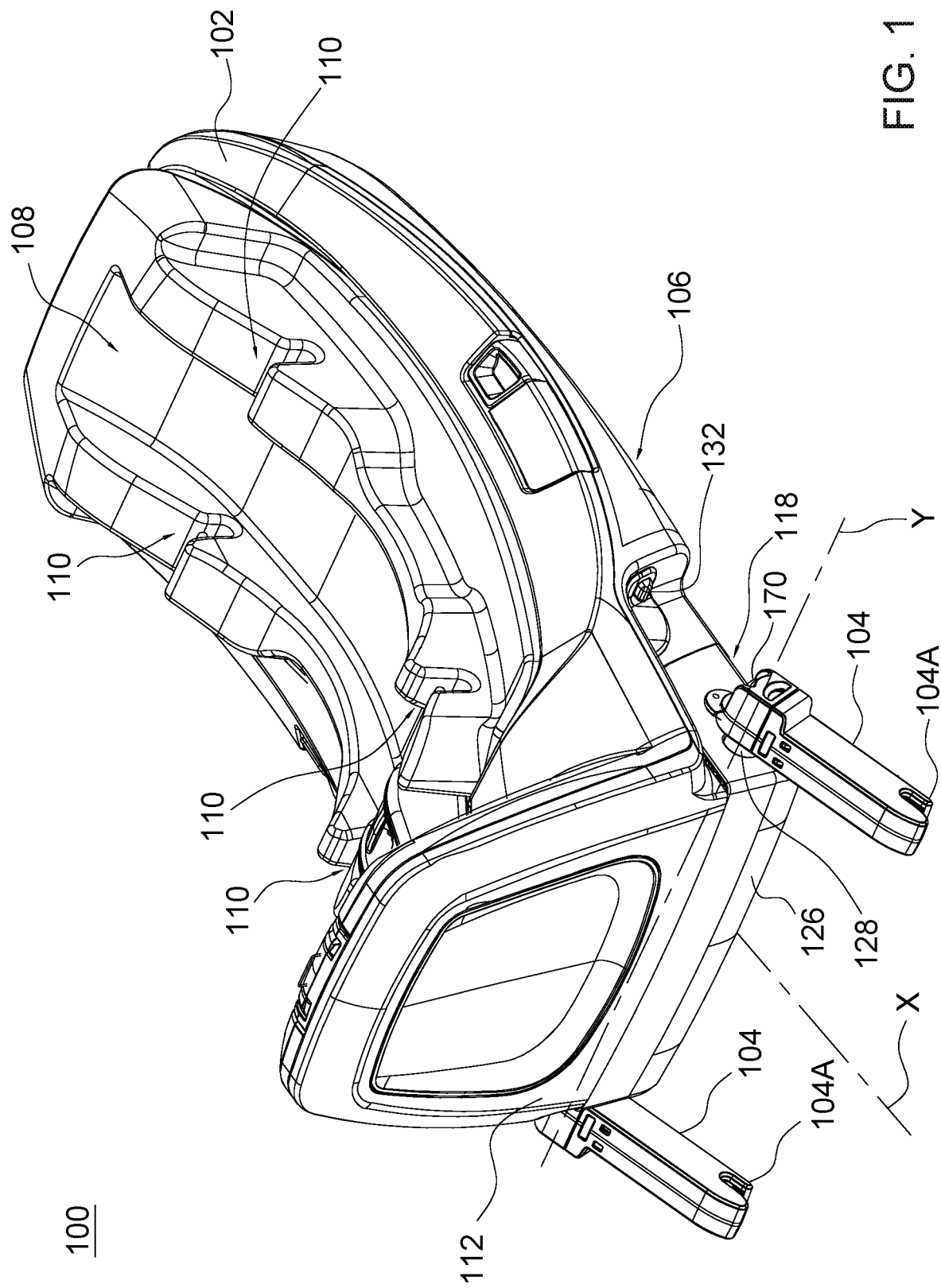
FIG. 1 is a perspective view illustrating an embodiment of a support base for a child safety seat.
Figure 2:
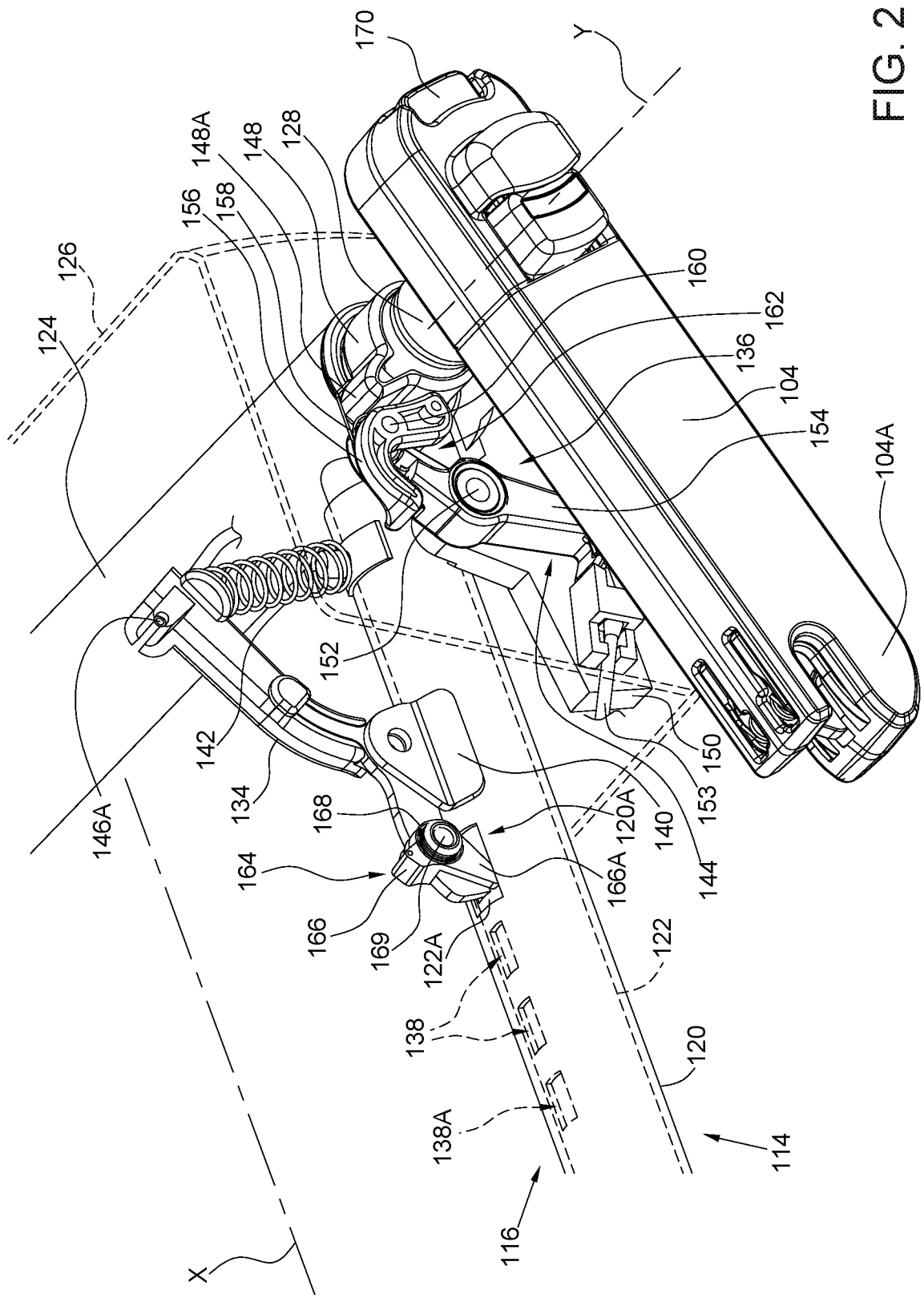
FIG. 2 is a schematic perspective view illustrating some inner construction details of the support base including an adjustment latch, a release actuation mechanism and a detent mechanism.
Figure 3:
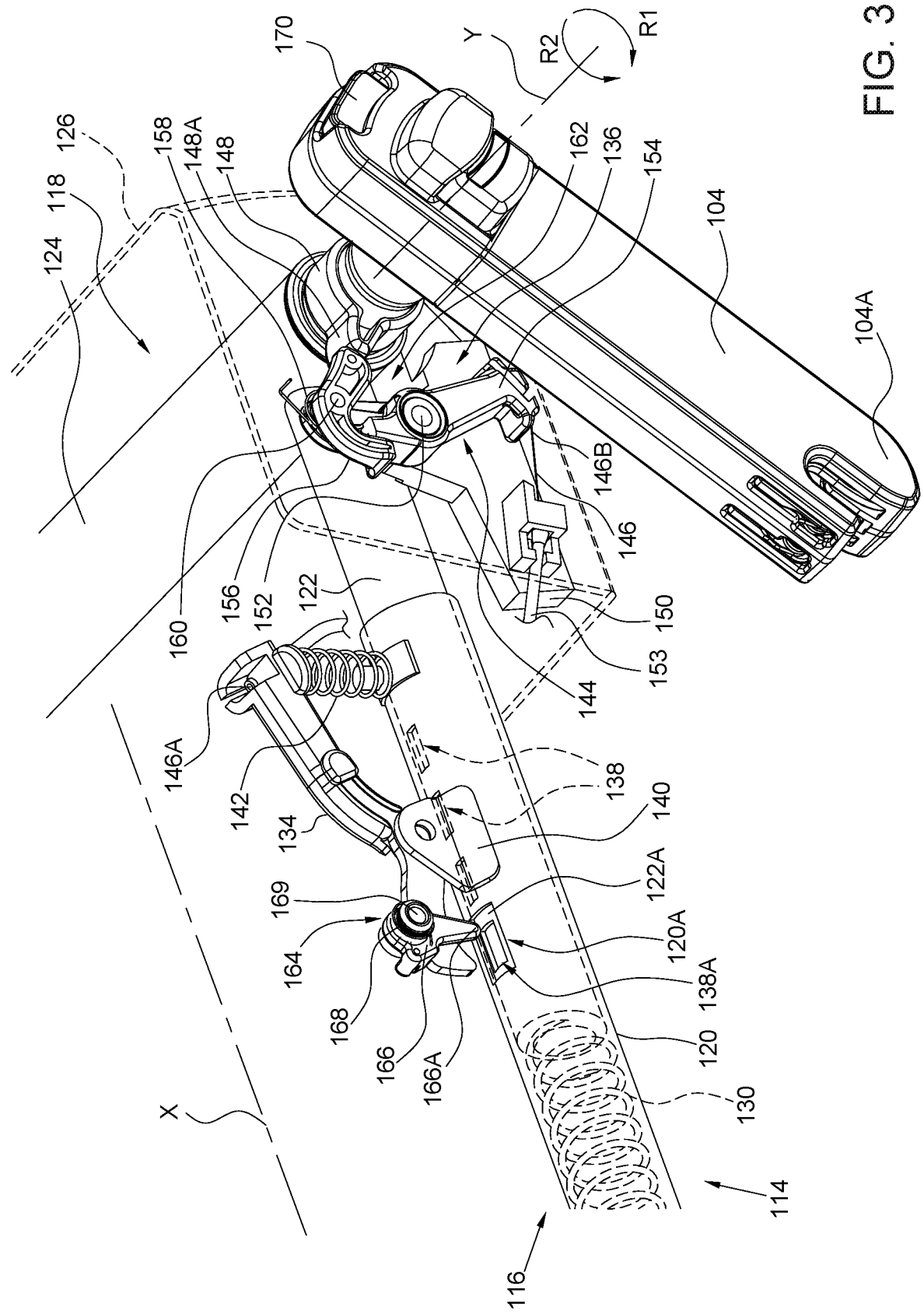
FIG. 3 is a schematic perspective view illustrating the inner construction of the support base shown in FIG. 2 with the adjustment latch in a disengaged state.
Figure 4:
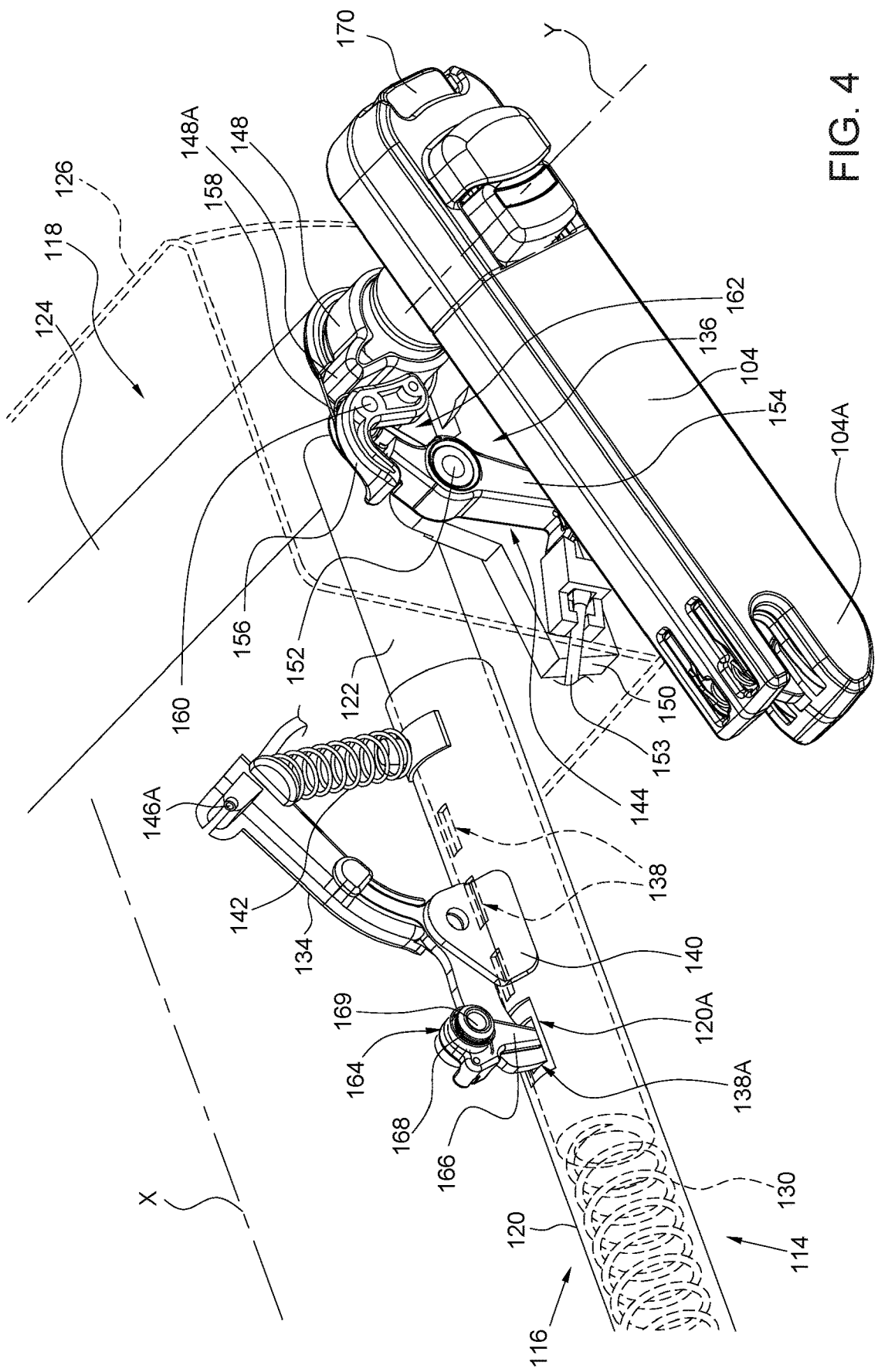
FIG. 4 is a schematic perspective view illustrating the inner construction of the support base shown in FIG. 2 with the adjustment latch dropping in an initial locking opening and the detent mechanism in a release state.

FIG. 1 is a perspective view illustrating an embodiment of a support base 100 for a child safety seat, and FIGS. 2-4 are schematic views illustrating some inner construction details of the support base 100. Referring to FIGS. 1-4, the support base 100 can include a shell 102 and two latch devices 104. The shell 102 can include one or more rigid casing portions attached to each other. Exemplary materials suitable for making the shell 102 may include rigid plastic materials. The shell 102 can have a bottom suitable 106 for placement on a vehicle seat, and an upper surface 108 suitable for receiving the installation of a child seat (not shown). For example, the upper surface 108 of the shell 102 can include a plurality of cavities 110 in which corresponding portions of a child seat may be received and locked in position. In some embodiments, the upper surface 108 of the shell 102 may be carried by a sliding platform movable back and forth relative to a lower portion of the shell 102 for adjustment of a child seat installed on the support base 100.

The two latch devices 104 may be assembled with the shell 102 adjacent to an end edge 112 of the shell 102, and can be respectively disposed adjacent to a left and a right side of the shell 102. The two latch devices 104 are operable to releasably engage with an anchor structure (e.g., ISOFIX anchor) provided in a vehicle to lock the support base 100 in place on a vehicle seat. Each latch device 104 can engage and lock with the anchor structure of a vehicle at a distal end 104A of the latch device 104.

Referring to FIGS. 1-4, the support base 100 can further include a coupling structure 114 that is coupled to the shell 102 and the latch devices 104. The coupling structure 114 can be enclosed at least partially inside the shell 102, and can include an anchor frame 116, and a carrier 118 movably connected with the anchor frame 116. The shell 102 is omitted in FIGS. 2-4 for clarity of illustration. The anchor frame 116 can be fixedly attached to the shell 102. For example, the anchor frame 116 can include a tube segment 120 fixedly connected with the shell 102. The tube segment 120 can have any suitable shapes. For example, a cross-section of the tube segment 120 can include, without limitation, a circular shape, a rectangular shape, a square shape, a polygonal shape and the like.

The carrier 118 can carry the latch devices 104, and can be assembled with the anchor frame 116 for sliding movement along a lengthwise axis X extending from a front to a rear of the support base 100. For example, the carrier 118 can include a side tube segment 122 and a transversal tube segment 124 fixedly connected with each other. The side tube segment 122 of the carrier 118 is slidably connected with the tube segment 120 of the anchor frame 116. For example, the side tube segment 122 can be telescopically assembled with the tube segment 120, the side tube segment 122 being respectively received partially inside the tube segment 120. The transversal tube segment 124 can be fixedly connected with the side tube segment 122, and can extend transversally relative to the side tube segment 122.

According to an implementation, the anchor frame 116 may include two tube segments 120 parallel to each other that are symmetrically disposed at a left and a right side, and the carrier 118 may include two side tube segments 122 that are slidably connected with the two tube segments 120 like described previously.

Referring to FIGS. 1-4, according to an embodiment, the carrier 118 may further include a casing 126 that can receive at least partially the side tube segment 122 and the transversal tube segment 124. For example, the side tube segment 122 and the transversal tube segment 124 may be fixedly attached to the casing 126. The casing 126 is shown with phantom lines in FIGS. 2-4 for clarity of illustration.

Referring again to FIGS. 1-4, the two latch devices 104 can be pivotally connected with the carrier 118 at two opposite sides thereof. For example, the two latch devices 104 can be respectively disposed at a left and a right side of the casing 126, and can be connected pivotally with the transversal tube segment 124 at two opposite ends thereof. According to an example of construction, the two latch devices 104 can be fixedly attached to two opposite ends of a rod 128, which is pivotally supported through the transversal tube segment 124. The latch devices 104 and the rod 128 can thereby rotate together about a pivot axis Y relative to the carrier 118.

With the aforementioned assembly, the carrier 118 (including the side tube segment 122, the transversal tube segment 124 and the casing 126) and the latch devices 104 can slide together along the lengthwise axis X relative to the shell 102 and the anchor frame 116 for lengthwise adjustment. For example, the carrier 118 can slide relative to the shell 102 in a first direction for displacing the distal end 104A of each latch device 104 outward and away from the end edge 112 of the shell 102, and in an opposite second direction for displacing the distal end 104A of each latch device 104 toward the end edge 112 of the shell 102. Moreover, the latch devices 104 can rotate about the pivot axis Y relative to the carrier 118 and the shell 102 between a storage position and multiple deployed positions for use. In the storage position, each latch device 104 can lie generally horizontal with the distal end 104A thereof retracted toward the shell 102. In any of the deployed positions, the distal end 104A of each latch device 104 can extend beyond the end edge 112 of the shell 102 (as exemplary shown in FIG. 1) for attachment to an anchor structure of a vehicle. Accordingly, the latch devices 104 can have at least two degrees of adjustment to facilitate the installation and locking of the support base 100 in a vehicle: a sliding adjustment along the lengthwise axis X, and a rotational adjustment about the pivot axis Y.

Referring to FIG. 3, according to an embodiment, the support base 100 can further include a spring 130 (shown with phantom lines) connected with the carrier 118. For example, the spring 130 can have two opposite ends respectively connected with the side tube segment 122 of the carrier 118 and the tube segment 120 of the anchor frame 116. The spring 130 can bias the carrier 118 toward a most extended position relative to the shell 102 and the anchor frame 116 for facilitating installation of the support base 100 on a vehicle seat.

Referring to FIG. 1, the shell 102 can further include a storage lock 132 operable to engage with a corresponding latch device 104 to keep the latch device 104 in the storage position. For example, the storage lock 132 can be assembled with the shell 102, and can be spring loaded to engage with the distal end 104A of the latch device 104 in the storage position. According to an implementation, the storage lock 132 may engage and lock the latch device 104 in the storage position while the carrier 118 is in a most extended position with respect to the shell 102 and the anchor frame 116. It will be appreciated, however, that the storage lock 132 may also be configured to engage and lock the latch device 104 in the storage position in other desirable positions of the carrier 118 with respect to the shell 102 and the anchor frame 116.

Referring to FIGS. 1-4, the support base 100 can further include an adjustment latch 134 and a release actuation mechanism 136. The adjustment latch 134 can be supported by the shell 102, and is movable relative to the shell 102 to engage and disengage any of multiple locking openings 138 provided on the carrier 118. For example, the adjustment latch 134 may be pivotally connected with a bracket 140 that is fixedly connected with the tube segment 120, the locking openings 138 can provided on the side tube segment 122 that is telescopically connected with the tube segment 120, and the adjustment latch 134 can travel through an opening 120A on the tube segment 120 to engage with any of the locking openings 138. The adjustment latch 134 can engage the carrier 118 for preventing sliding of the carrier 118 relative to the shell 102 in the first direction that displaces the distal end 104A of each latch device 104 outward and away from the end edge 112 of the shell 102, and disengage the carrier 118 for sliding of the carrier 118 relative to the shell 102.

According to an embodiment, the adjustment latch 134 may be shaped such that it operates like a ratchet that can selectively block motion of the carrier 118 in only the first direction for displacing the distal end 104A of each latch device 104 outward and away from the end edge 112 of the shell 102. Accordingly, the engagement of the adjustment latch 134 with any of the locking openings 138 can prevent sliding of the carrier 118 in the first direction while allowing sliding of the carrier 118 in the second direction for retracting the distal end 104A of each latch device 104 toward the end edge 112 of the shell 102.

Referring to FIGS. 2-4, the adjustment latch 134 can be spring biased to engage with any of the locking openings 138. For example, a spring 142 can be respectively connected with the adjustment latch 134 and a fixed structure provided in the shell 102 (e.g., the tube segment 120 or any suitable attachment structure fixedly connected with the tube segment 120), and can bias the adjustment latch 134 for engaging with the side tube segment 122 of the carrier 118.

In case the anchor frame 116 includes two tube segments 120 and the carrier 118 includes two side tube segments 122, two similar sets of the adjustment latch 134 and the spring 142 described previously may be provided on the two tube segments 120 for engagement with the two side tube segments 122.

Referring again to FIGS. 2-4, the release actuation mechanism 136 is operable to urge the adjustment latch 134 to disengage from the carrier 118 for sliding movement of the carrier 118 relative to the shell 102. According to an embodiment, the release actuation mechanism 136 can be operatively coupled to the adjustment latch 134 and the latch devices 104, and can be configured so that a rotation of the latch devices 104 toward the storage position causes the adjustment latch 134 to disengage from the carrier 118. For example, the release actuation mechanism 136 can include a cable actuator 144 supported by the carrier 118, a cable 146 having two opposite ends 146A and 146B respectively connected with the adjustment latch 134 and the cable actuator 144, and a cam 148 rotationally coupled to the latch devices 104. The cable actuator 144 may be pivotally connected with the carrier 118. For example, the casing 126 may be fixedly connected with a mount bracket 150, and the cable actuator 144 can be pivotally connected with the mount bracket 150 via a pivot connection 152. The cam 148 can have a protrusion 148A, and can be fixedly attached to the rod 128 so that the latch devices 104 and the cam 148 can rotate in unison in either direction. As the latch devices 104 rotate toward the storage position, the cam 148 can rotate along with the latch devices 104 so that the protrusion 148A of the cam 148 can contact and urge the cable actuator 144 in movement, which in turn applies a pulling action on the cable 146 that causes the adjustment latch 134 to disengage from the carrier 118. According to an implementation, the cable 146 can be exemplary guided for movement through the interior of a sheath 153 having two opposite ends respectively connected with the adjustment latch 134 and the mount bracket 150.

According to an example of construction, the cable actuator 144 may include an actuating portion 154, a catching portion 156 and a spring 158. The actuating portion 154 can be pivotally connected with the mount bracket 150 of the carrier 118 via the pivot connection 152, and can be attached to the end 146B of the cable 146. The catching portion 156 can be movably connected with the actuating portion 154 so as to be movable between a deployed state and a retracted state. For example, the catching portion 156 may be pivotally connected with the actuating portion 154 via a pivot connection 160, so that the catching portion 156 can rotate relative to the actuating portion 154 between the deployed state and the retracted state. The actuating portion 154 and the catching portion 156 can delimit at least partially a concavity 162 in the deployed state, and a rotation of the catching portion 156 from the deployed state toward the retracted state can reduce the concavity 162.

The spring 158 can be respectively connected with the actuating portion 154 and the catching portion 156, and can bias the catching portion 156 toward the deployed state. The spring 158 may be exemplary a torsion spring.

With the aforementioned construction, a rotation of the latch devices 104 in a direction R1 toward the storage position can cause the protrusion 148A of the cam 148 to contact with the catching portion 156 in the deployed state. This contact between the cam 148 and the catching portion 156 can be a sliding contact occurring in the concavity 162 before the latch devices 104 reach the storage position. As a result, the cam 148 can urge the catching portion 156 and the actuating portion 154 to move together for pulling the cable 146 and causing the adjustment latch 134 to disengage from the carrier 118. Once the latch devices 104 reach the storage position, the protrusion 148A of the cam 148 has traveled past the catching portion 156, which allows the actuating portion 154 and the catching portion 156 to return to a neutral position releasing the pull on the cable 146.

A reverse rotation of the latch devices 104 from the storage position in a direction R2 toward a deployed position can cause the protrusion 148A of the cam 148 to contact and push the catching portion 156 to rotate relative to the actuating portion 154 from the deployed state toward the retracted state against the biasing force of the spring 158. As a result, the protrusion 148A of the cam 148 is allowed to travel past the actuating portion 154 without imparting any movement to the cable 146. This allows the adjustment latch 134 to remain in a locking state while the latch devices 104 are rotated to a deployed position.

In an embodiment where two adjustment latches 134 are provided, two sets of the same release actuation mechanism 136 described previously may be respectively coupled to the two adjustment latches 134 and the latch devices 104.

Referring to FIGS. 2-4, according to an embodiment, each adjustment latch 134 can further be connected with a detent mechanism 164 operable to prevent the adjustment latch 134 from reengaging the carrier 118 after the adjustment latch 134 is disengaged therefrom, the detent mechanism 164 being released when the carrier 118 is in the most extended position. According to an example of construction, the detent mechanism 164 can include a spacer 166 and a spring 168. The spacer 166 can be pivotally connected with the adjustment latch 134 about a pivot connection 169, and can have an end 166A eccentric from the pivot connection 169. The spring 168 can be respectively connected with the spacer 166 and the adjustment latch 134. For example, the spring 168 may be a torsion spring that is assembled adjacent to the pivot connection 169 of the spacer 166 and has two ends respectively connected with the spacer 166 and the adjustment latch 134.

When the adjustment latch 134 disengages from the carrier 118 at a position other than the most extended position, the spring 168 can bias the spacer 166 to rotate relative to the adjustment latch 134 to an impeding position where the end 166A of the spacer 166 can project beyond the adjustment latch 134. While the spacer 166 is in the impeding position, the end 166A of the spacer 166 can contact against a surface of the carrier 118 for preventing engagement of the adjustment latch 134 with the carrier 118. For example, the end 166A of the spacer 166 can contact against a surface 122A of the side tube segment 122 in the impeding position, whereby the adjustment latch 134 can be kept apart from the side tube segment 122 in the unlocked state. According to an implementation, the spacer 166 may extend generally perpendicular from the surface 122A of the side tube segment 122 when the end 166A of the spacer 166 contacts against the surface 122A in the impeding position.

The detent mechanism 164 can be released when the carrier 118 slides and reaches the most extended position relative to the shell 102 and the anchor frame 116. For example, the locking openings 138 provided on the side tube segment 122 can include an initial locking opening 138A corresponding to the most extended position of the carrier 118 that is greater in size than all the other locking openings 138, and the end 166A of the spacer 166 can drop into the initial locking opening 138A to release the detent mechanism 164 when the carrier 118 reaches the most extended position. According to an implementation, the adjustment latch 134 may also drop into the initial locking opening 138A along with the spacer 166 when the detent mechanism 164 is released. Accordingly, the most extended position of the carrier 118 can be defined as a reset position where the carrier 118 has to be repositioned before the support base 100 is installed on a vehicle seat. This can help to ensure that the support base 100 is properly installed on a vehicle seat.

Moreover, sliding of the carrier 118 relative to the shell 102 away from the most extended position for displacing the distal end 104A of the latch device 104 toward the end edge 112 of the shell 102 can cause the carrier 118 to push the adjustment latch 134 and the spacer 166 to disengage from the initial locking opening 138A. The spacer 166 biased by the spring 168 can remain in contact with a surface of the carrier 118 (e.g., the surface 122A of the side tube segment 122 adjacent to the locking openings 138) when the carrier 118 slides for displacing the distal end 104A of the latch device 104 toward the end edge 112 of the shell 102 or the adjustment latch 134 engages with any of the locking openings 138 other than the initial locking opening 138A, the spacer 166 being tilted an angle relative to the contacting surface of the carrier 118. Accordingly, the detent mechanism 164 can remain released and would not affect the operation of the adjustment latch 134 when the carrier 118 slides relative to the shell 102 in the direction for displacing the distal end 104A of the latch device 104 toward the end edge 112 of the shell 102. FIG. 2 exemplary illustrates the adjustment latch 134 engaged with one of the locking openings 138 other than the initial locking opening 138A with the spacer 166 in contact with the surface 122A of the side tube segment 122. FIG. 3 exemplary illustrates the adjustment latch 134 disengaged from the side tube segment 122. FIG. 4 exemplary illustrates the adjustment latch 134 and the spacer 166 dropping in the initial locking opening 138A so that the detent mechanism 164 is in a release state.

Exemplary operation for installing the support base 100 on a vehicle seat is described hereinafter with reference to FIGS. 1-4. Before it is installed on a vehicle seat, the support base 100 can be in an initial state in which the carrier 118 is in the most extended position with respect to the shell 102 and the latch devices 104 are kept by the storage lock 132 in the storage position. When the support base 100 is to be installed on a vehicle seat, the storage lock 132 can be first disengaged from the corresponding latch device 104. For example, a release actuator 170 (shown in FIG. 1) provided on the latch device 104 may be operated to urge the storage lock 132 in movement for disengaging from the distal end 104A of the latch device 104. More specifically, the release actuator 170 provided on the latch device 104 can be typically connected with an internal part (not shown) movable for unlocking the latch device 104 from an anchor structure of a vehicle, the movement of this internal part being also usable to urge the storage lock 132 to disengage from the latch device 104. The release actuator 170 and the internal part coupled thereto are well known in existing latch devices 104, the description of which will be omitted herein.

Once the latch devices 104 are unlocked from the shell 102, the latch devices 104 can be rotated from the storage position to a desirable deployed position Like described previously, as the latch devices 104 rotate toward a deployed position, the protrusion 148A of the cam 148 can contact and push the catching portion 156 to rotate relative to the actuating portion 154 from the deployed state toward the retracted state. As a result, the protrusion 148A of the cam 148 may be allowed to travel past the actuating portion 154 without imparting any movement to the cable 146. Accordingly, the adjustment latch 134 can remain in a locking state engaged with the initial locking opening 138A while the latch devices 104 are rotated to the deployed position.

The support base 100 then can be positioned on a vehicle seat, and each latch device 104 in the deployed position can attach to an anchor structure of the vehicle seat with the carrier 118 in the most extended position. Then the shell 102 can be pushed toward the seatback of the vehicle seat for positioning the end edge 112 of the shell 102 in abutment against the seatback of the vehicle seat. As a result, the carrier 118 and the latch devices 104 can slide together relative to the shell 102 and the anchor frame 116 away from the most extended position for reducing a distance between the distal end 104A of each latch device 104 and the end edge 112 of the shell 102. This displacement of the carrier 118 relative to the shell 102 and the anchor frame 116 causes the carrier 118 to push the spacer 166 and the adjustment latch 134 to disengage from the initial locking opening 138A and then slide along the side tube segment 122. During this displacement, the adjustment latch 134 may travel past one or more of the locking openings 138 whereas the spacer 166 can be in sliding contact with the surface 122A of the side tube segment 122. Once the end edge 112 of the shell 102 abuts against the seatback of the vehicle seat, the adjustment latch 134 can engage with a corresponding locking opening 138 whereas the spacer 166 remains in contact with the surface 122A of the side tube segment 122.

When the support base 100 is not used, the latch devices 104 can be detached from the anchor structure of the vehicle for removal of the support base 100. The latch devices 104 then can be rotated relative to the carrier 118 and the shell 102 to the storage position. This rotation of the latch devices 104 can cause the adjustment latch 134 to disengage from the side tube segment 122 of the carrier 118 via operation of the release actuation mechanism 136 as described previously. As the adjustment latch 134 disengages from the carrier 118, the spring 168 can bias the spacer 166 of the detent mechanism 164 to an impeding position where the end 166A of the spacer 166 can project beyond the adjustment latch 134 and contact against the surface 122A of the side tube segment 122. The adjustment latch 134 can be thereby kept apart from the side tube segment 122 in the unlocked state. The spring 130 can then bias the carrier 118 to move relative to the shell 102 and the anchor frame 116 to the most extended position as described previously.

It will be appreciated that at least some portions of the support base 100 illustrated previously may be independently implemented. For example, the release actuation mechanism 136 and the detent mechanism 164 may be implemented independent from each other.

Figure 5:
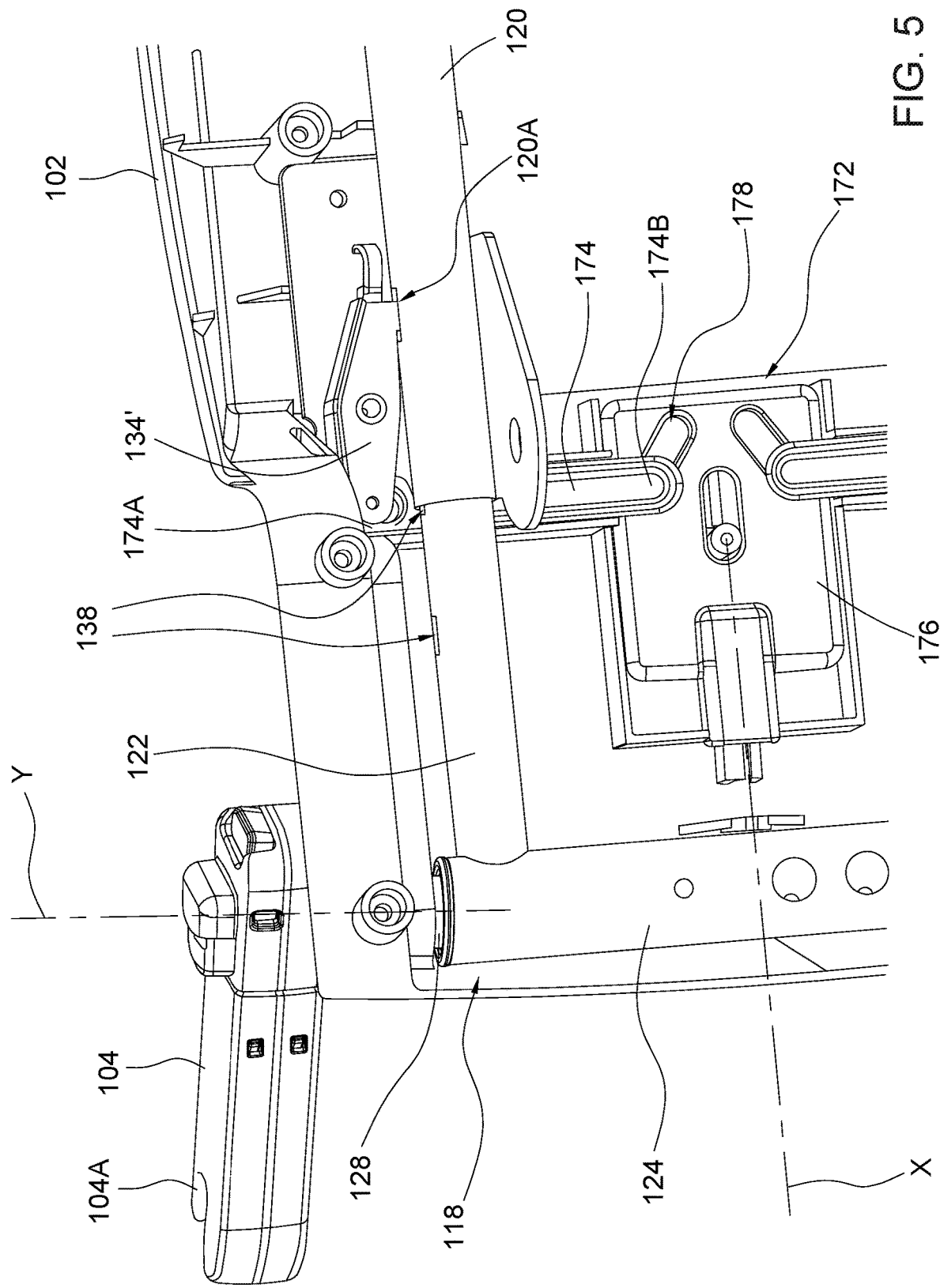
FIG. 5 is a schematic perspective view illustrating another embodiment of the adjustment latch and the release actuation mechanism provided in the support base.
Figure 6:
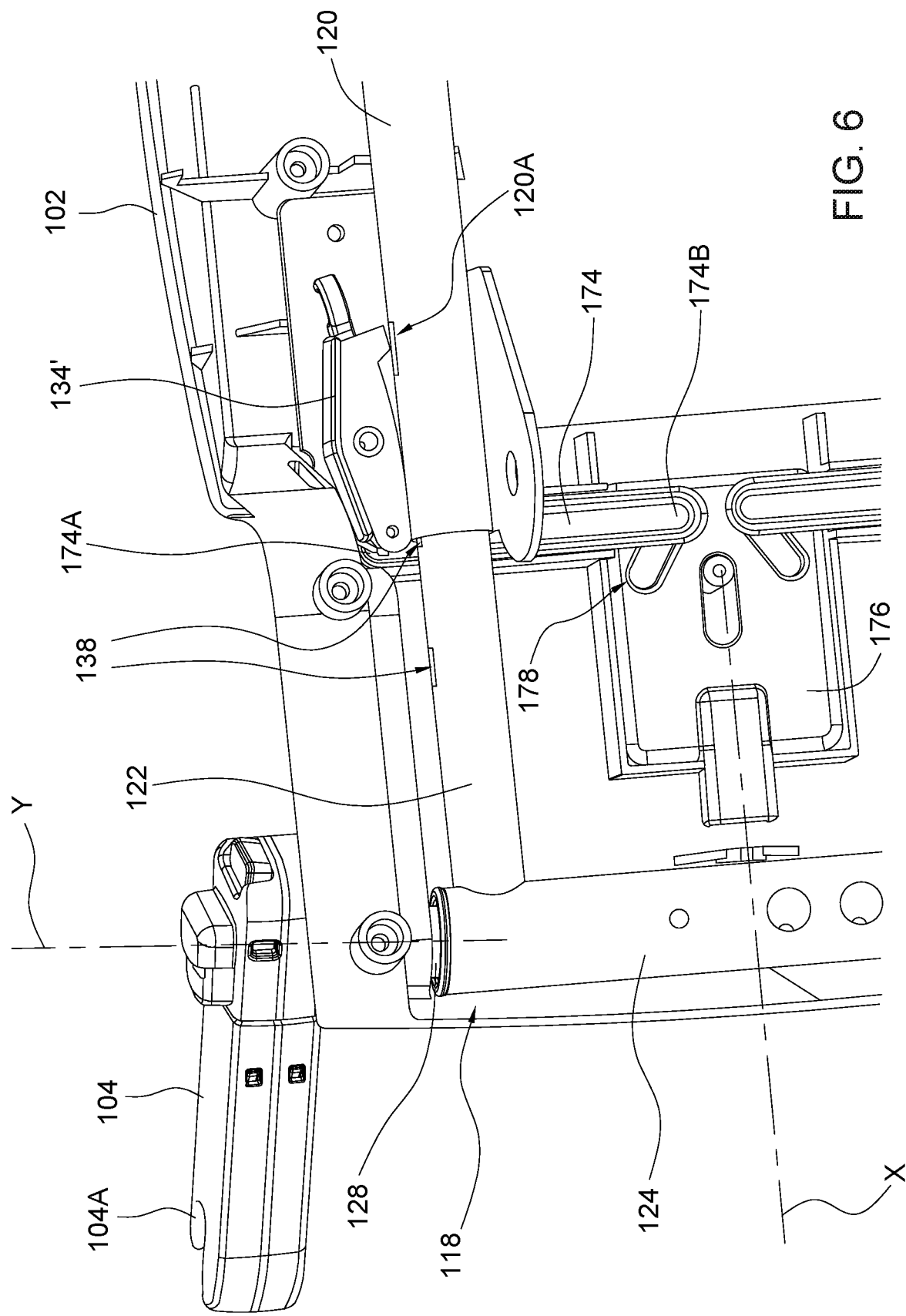
FIG. 6 is a schematic perspective view illustrating the adjustment latch shown in FIG. 4 in a disengaged state.

FIGS. 5 and 6 are schematic perspective views illustrating another release actuation mechanism 172 coupled to the adjustment latch 134'. Referring to FIGS. 5 and 6, the adjustment latch 134' can be pivotally connected with the shell 102, and is rotatable to engage and disengage any of multiple locking openings 138 provided on the side tube segment 122 of the carrier 118. The release actuation mechanism 172 can include a linking part 174 and an actuator 176. The linking part 174 can have an end 174A pivotally connected with the adjustment latch 134', and another end 174B slidably connected with the actuator 176. More specifically, the end 174B of the linking part 174 can be guided for sliding movement along an elongate slot 178 provided in the actuator 176, the elongate slot 178 being tilted an angle relative to the lengthwise axis X of the shell 102. Moreover, the actuator 176 can be assembled with the shell 102 for sliding movement along the lengthwise axis X. With this assembly, the actuator 176 is operable to cause the linking part 174 to move via the sliding connection between the elongate slot 178 and the end 174B of the linking part 174, which in turn urge the adjustment latch 134' in rotation for disengaging from the side tube segment 122 of the carrier 118. FIG. 5 illustrates the adjustment latch 134' in an engaged state, and FIG. 6 illustrates the adjustment latch 134' in a disengaged state.

Figure 7:
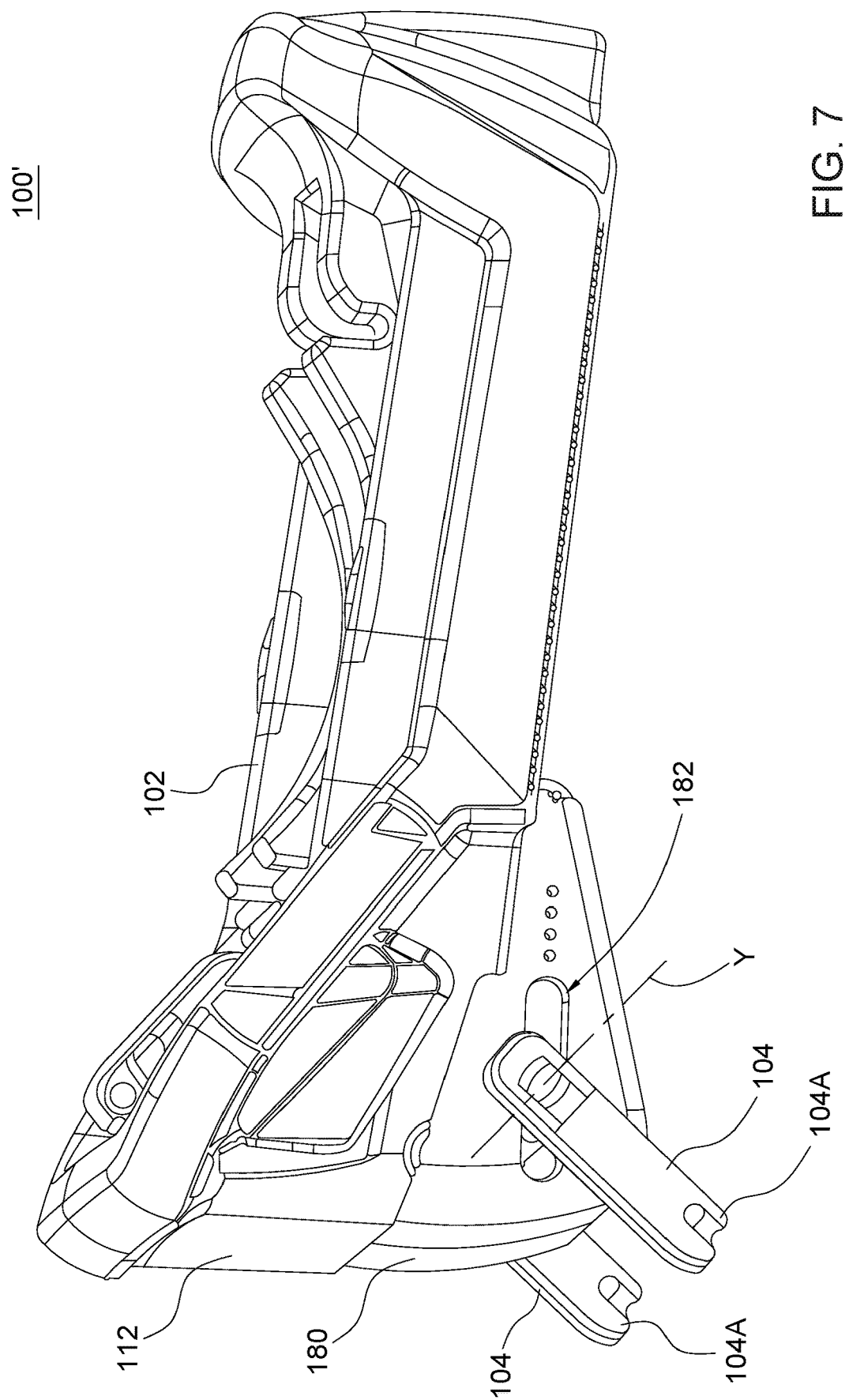
FIGS. 7 and 8 are schematic perspective views illustrating another embodiment of a support base allowing sliding and rotational adjustments of the latch devices.
Figure 8:
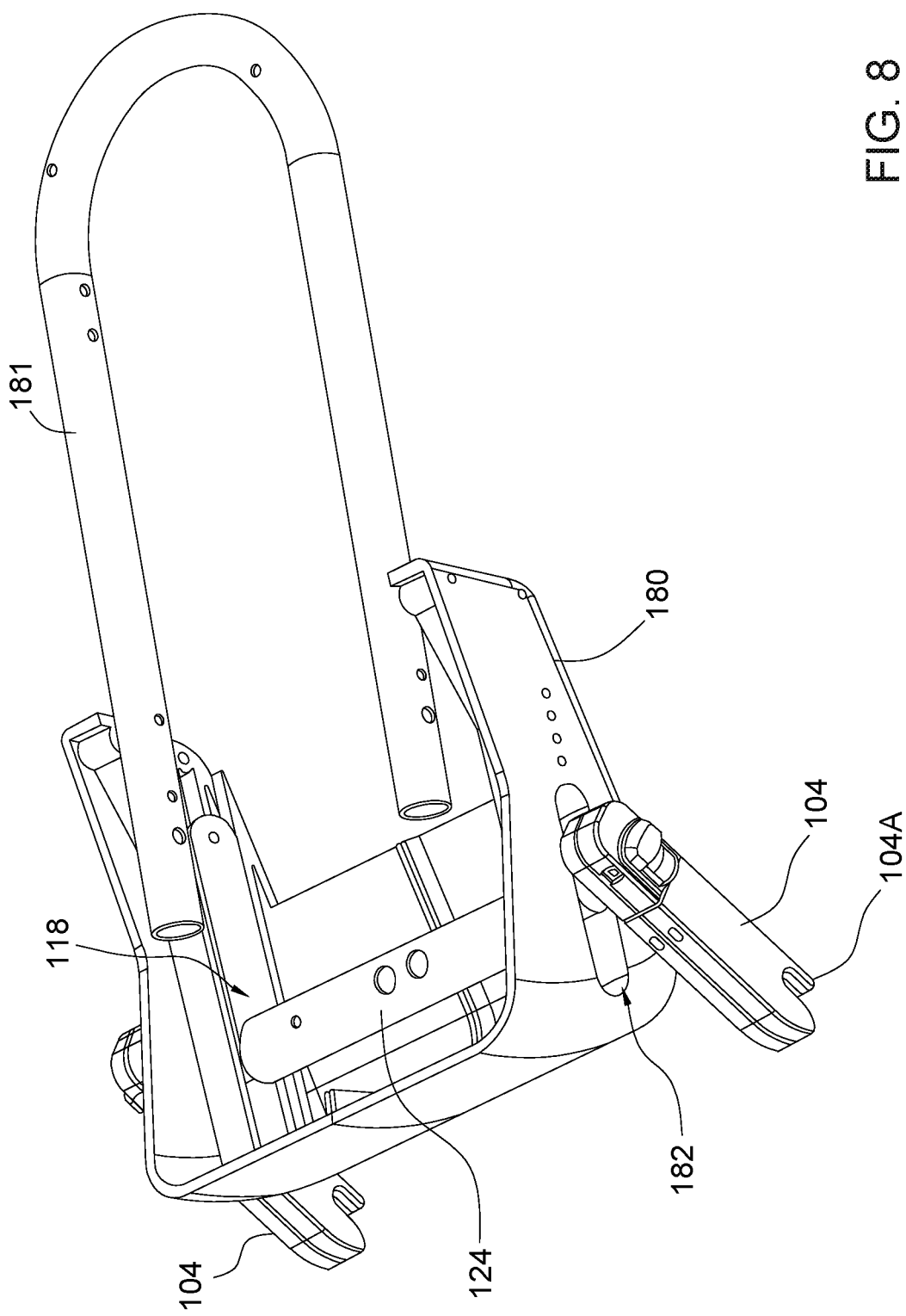

FIGS. 7 and 8 are schematic perspective views illustrating another embodiment of a support base 100' allowing sliding and rotational adjustments of the latch devices 104. Referring to FIGS. 7 and 8, the shell 102 of the support base 100' can include a recline foot 180 operable to adjust an angular position of the support base 100' on a vehicle seat. The recline foot 180 may be pivotally assembled with the shell 102. According to an example of construction, the shell 102 may be fixedly connected with an anchor frame 181, and the recline foot 180 may be pivotally connected with the anchor frame 181. The carrier 118 pivotally supporting the latch devices 104 can be slidably assembled with the recline foot 180. For example, the transversal tube segment 124 of the carrier 118 may be guided for sliding movement along two parallel guide slots 182 provided in two opposite sidewalls of the recline foot 180. The latch devices 104 are thereby adjustable relative to the shell 102 and the recline foot 180 at any angular position of the support base 100'. Since the carrier 118 is supported by the recline foot 180, the latch devices 104 can be kept sufficiently low for proper attachment to an anchor structure of a vehicle at any angular position of the support base 100'.

Advantages of the structures described herein include the ability to provide a support base for a child safety seat that allows sliding and rotational adjustments of the latch devices for facilitating installation of the support base on a vehicle seat.

Realization of the support base for a child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A support base for a child safety seat, comprising:
    a shell having an end edge;
    a latch device having a distal end, the latch device being operable to releasably engage with an anchor structure provided in a vehicle at the distal end thereof;
    a coupling structure coupled to the latch device and the shell, the coupling structure including a carrier that is pivotally connected with the latch device and is slidable relative to the shell, the latch device being rotatable relative to the carrier and the shell between a storage position and multiple deployed positions for use, and the carrier being movable relative to the shell in a first direction for displacing the distal end of the latch device outward and away from the end edge of the shell and in an opposite second direction for displacing the distal end of the latch device toward the end edge of the shell; and
    an adjustment latch movable to engage with the carrier for preventing sliding of the carrier relative to the shell in the first direction, and to disengage from the carrier for sliding of the carrier relative to the shell.

2. The support base according to claim 1, wherein the coupling structure further includes a first tube segment fixedly connected with the shell, and the carrier includes a second and a third tube segment fixedly connected with each other, the second tube segment being slidably connected with the first tube segment, and the third tube segment extending transversally relative to the second tube segment and being pivotally connected with the latch device.

3. The support base according to claim 2, wherein the carrier further includes a casing in which the second and third tube segments are assembled, the latch device being disposed at a side of the casing, and the casing, the latch device and the second and third tube segments being slidable in unison relative to the shell and the first tube segment.

4. The support base according to claim 1, wherein the adjustment latch is shaped such that the engagement of the adjustment latch with the carrier prevents sliding of the carrier in the first direction and allows sliding of the carrier in the second direction.

5. The support base according to claim 1, wherein the coupling structure further includes a tube segment fixedly connected with the shell, and the carrier includes a portion telescopically assembled with the tube segment, the adjustment latch traveling through the tube segment to engage with the portion of the carrier.

6. The support base according to claim 5, wherein the tube segment is fixedly connected with a bracket, and the adjustment latch is pivotally connected with the bracket.

7. The support base according to claim 1, further including a release actuation mechanism coupled to the latch device and the adjustment latch, the release actuation mechanism being configured so that a rotation of the latch device toward the storage position causes the adjustment latch to disengage from the carrier.

8. The support base according to claim 7, wherein the release actuation mechanism includes a cable actuator supported by the carrier, a cable having two opposite ends respectively connected with the adjustment latch and the cable actuator, and a cam rotationally coupled to the latch device, a rotation of the latch device toward the storage position causing the cam to contact and urge the cable actuator in movement, the cable actuator thereby applying a pulling action on the cable that causes the adjustment latch to disengage from the carrier.

9. The support base according to claim 8, wherein the cable actuator is pivotally connected with the carrier.

10. The support base according to claim 8, wherein the cable actuator includes:
    an actuating portion attached to one end of the cable and movably connected with the carrier;
    a catching portion movably connected with the actuating portion, the catching portion being movable relative to the actuating portion between a deployed state and a retracted state; and
    a spring respectively connected with the actuating portion and the catching portion, the spring biasing the catching portion toward the deployed state;
    wherein a rotation of the latch device toward the storage position causes the cam to contact against the catching portion in the deployed state and thereby urges the catching portion and the actuating portion to move together for pulling the cable, and a rotation of the latch device away from the storage position causes the cam to push the catching portion to move relative to the actuating portion from the deployed state toward the retracted state without urging the actuating portion.

11. The support base according to claim 10, wherein the actuating portion is pivotally connected with the carrier, and the catching portion is pivotally connected with the actuating portion.

12. The support base according to claim 1, further including a release actuation mechanism coupled to the adjustment latch, wherein the adjustment latch is pivotally connected with the shell, and the release actuation mechanism includes a linking part pivotally connected with the adjustment latch, and an actuator connected with the linking part and slidably assembled with the shell, the actuator being operable to cause rotation of the adjustment latch for disengaging from the carrier.

13. The support base according to claim 1, wherein the carrier includes a plurality of locking openings, and the adjustment latch is supported by the shell and is spring biased to engage with any of the locking openings, the locking openings including an initial locking opening corresponding to a most extended position of the carrier relative to the shell.

14. The support base according to claim 13, wherein the adjustment latch is connected with a detent mechanism, the detent mechanism being operable to prevent the adjustment latch from reengaging the carrier after the adjustment latch is disengaged therefrom, the detent mechanism being released when the carrier is in the most extended position.

15. The support base according to claim 14, wherein the detent mechanism includes:
- a spacer connected with the adjustment latch; and
- a spring respectively connected with the spacer and the adjustment latch;
- wherein when the adjustment latch is disengaged from the carrier at a position other than the most extended position, the spring biases the spacer to an impeding position that prevents engagement of the adjustment latch with the carrier.

16. The support base according to claim 15, wherein the spacer is pivotally connected with the adjustment latch.

17. The support base according to claim 15, wherein an end of the spacer projects beyond the adjustment latch and contacts against a surface of the carrier to prevent engagement of the adjustment latch with the carrier when the spacer is in the impeding position, and the end of the spacer drops in the initial locking opening to release the detent mechanism when the carrier is in the most extended position.

18. The support base according to claim 17, wherein sliding of the carrier relative to the shell away from the most extended position for displacing the distal end of the latch device toward the end edge of the shell causes the carrier to push the spacer to disengage from the initial locking opening, the spacer remaining in contact with the surface of the carrier when the adjustment latch engages with any of the locking openings other than the initial locking opening.

19. The support base according to claim 1, further including a spring connected with the carrier, the spring biasing the carrier toward a most extended position relative to the shell.

20. The support base according to claim 1, wherein the shell further includes a storage lock, the storage lock being operable to engage with the latch device to keep the latch device in the storage position while the carrier is in a most extended position with respect to the shell.

21. The support base according to claim 1, wherein the shell includes a recline foot operable to adjust an angular position of the support base on a vehicle seat, and the carrier is slidably assembled with the recline foot.

* * * * *